Patented Aug. 3, 1954

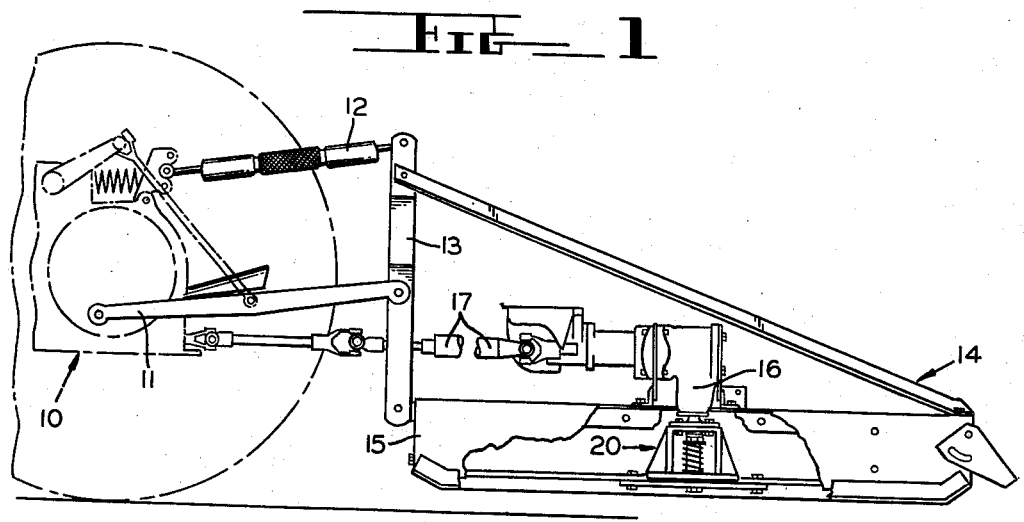
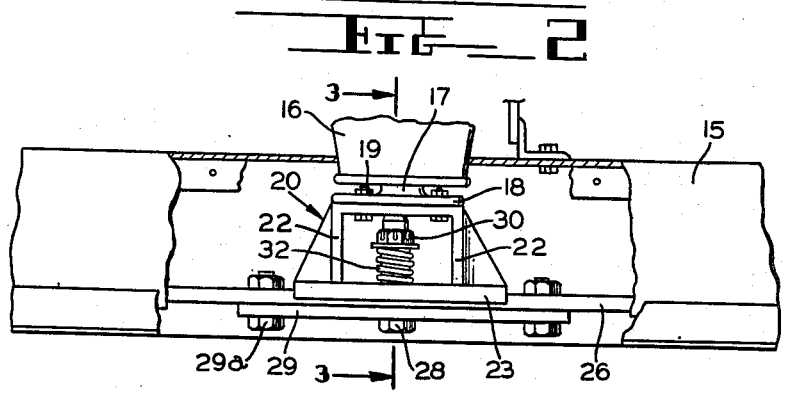
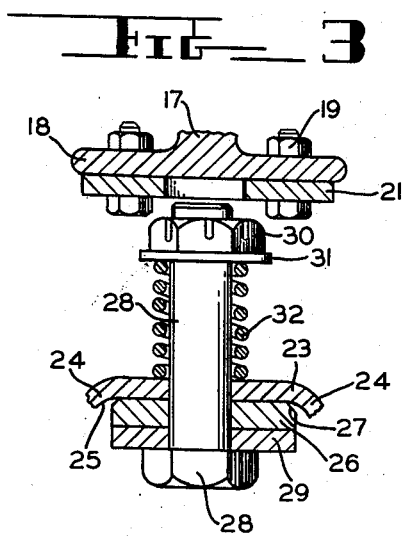

2,685,160

UNITED STATES PATENT OFFICE 2,685,160

ROTARY STALK CUTTER WITH SAFETY CLUTCH

Emery E. Kuhary, Royal Oak, and Frederick D. Sawyer, Birmingham, Mich., assignors, by mesne assignments, to Ford Motor Company, Dearborn, Mich., a corporation of Delaware Application June 4, 1952, Serial No. 291,695

3 Claims. (Cl. 56—25.4)

The present invention relates to an overload release clutch for a rotary element and, more particularly, to a safety clutch for a power driven cutting element of a stalk cutter or the like.

The present invention provides a novel form of overload clutch for a rotary cutting element, such as the rotatable blade of a lawn mower, stalk cutter, or the like. Such power driven cutters are employed for the shredding of crop residues, for pasture maintenance, brush clearance, or the like, and are power driven from a suitable source, such as a prime mover or tractor. It will be appreciated that the high peripheral speeds and large inertia forces developed in a swinging blade on the order of five feet in diameter may cause serious damage to the blade and/or the driving mechanism therefor upon striking an obstruction such as a stone, stump, or the like.

The present invention provides a safety clutch for a stalk cutter or the like which is extremely simple in construction and operation, and which provides for the interruption of the blade drive upon the subjection of the blade to a greater than predetermined resistance. More specifically, the clutch of the present invention comprises generally a power driven, blade-contacting plate having a concave surface against which a central portion of the blade normally abuts. The blade is driven by its contact with the plate and is retained against the concave surface of the plate by a spring or similar means biasing the two members into contact. It will be appreciated that movement of the blade from its nesting contact with the plate will, against the resistance of the spring, interrupt the cutter drive.

It is, therefore, an important object of the present invention to provide an improved clutch for a rotary cutter whereby driving of the blade is interrupted upon subjection of the blade to an unusual resistance.

Another important object is the provision of a safety clutch for a rotary cutting element including a blade-contacting plate adapted to be driven from a power source and spring means urging the plate into contact with the blade so as to effect corotation of the plate and the blade.

A further important object is the provision of a drive mechanism for a rotary cutter including a blade-contacting member having a recess therein adapted to receive a portion of the rotary member and means biasing the rotary member into contact with the recessed portion of the driving member under a predetermined load, the biasing means being deflectible under greater than predetermined load for interrupting the driving of the rotary element.

It is still another object of the present invention to provide an improved rotary cutter wherein a rotatable blade is retained in contact with a driving member by resiliently deformable means under a predetermined stress sufficient to normally retain the blade and driving member in driving engagement, but resiliently deformable upon subjection of the blade to a shock load to release the blade and driving member from such engagement.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a side elevational view of a rotary cutter provided with a clutch of the present invention and adapted to be driven by a suitable prime movement, such as the illustrated tractor;

Figure 2 is an enlarged fragmentary elevational view, with parts broken away in section, further illustrating a clutch of the present invention; and Figure 3 is a greatly enlarged sectional view, with parts shown in elevation, taken along the plane 3—3 of Figure 2.

As shown on the drawings:

In Figure 1, reference numeral 10 refers generally to a tractor, such as the well-known Ford tractor, provided with a power liftable implement linkage including a pair of laterally spaced lower links 11 adapted to be power elevated by the conventional tractor driven hydraulic mechanism and a variable length top link 12 positioned above and laterally intermediate the lower links 11. The links 11 and 12 are pivotally attached to an A-frame 13 forming a part of a rotary cutter 14.

The cutter 14 comprises a generally rectangular housing 15 rigidly secured to the A-frame 13 and adapted to be power elevated upon actuation of the links 11. Atop the housing 15 there is provided a gear case 16 containing a bevel gear set (not shown) adapted to be driven from the power takeoff by a longitudinally extensible, universally jointed power-takeoff shaft 17 coupled to the power-takeoff shaft of the tractor 10.

The gear box 16 is provided with an output shaft 17 (Figures 2 and 3) terminating in a radially enlarged flange 18. The flange 18 is secured, as by bolts 19, to a depending cage 20 comprising a cover plate 21 abutting the underside of the flange 18 and depending side plates 22 rigidly joined, as by welding, to a lower channel shaped clutch plate 23 joining the lower ends thereof and extending generally parallel to the upper plate 21. The clutch plate 23 is provided at its edges with depending outwardly extending terminal flanges 24 and curved inner surfaces or walls 25, so that the undersurface of the plate 23 is generally concave. A cutter blade 26 is positioned to directly underlie the plate 23 in contact with the under concave surface thereof. The lateral edges of the central portion of the blade are chamfered, as at 27, to abut the surfaces 25 of the plate 23. The blade 26 is retained in contact with the plate 23 by means of a vertically extending bolt 28 projecting upwardly to lie between the walls 22 of the drive member 20. The head of the bolt 28 abuts a blade center plate 29 underlying the central portion of the blade 26, and the shank of the bolt 28 carries at its upper end a nut 30 and a washer 31 cooperating with the upper surface of the plate 23 to confine therebetween a coiled spring 32. The plate 29 is rigidly secured to the blade 26 by spaced bolts 29a.

The blade 26 is pivotable about the bolt or stub shaft 28, which is axially aligned with the shaft 17, and the only resistance to such pivoting movement of the blade is the frictional engagement of the blade 26 with the under surface of the plate 23 urged thereagainst by the spring 32. The compression force in the spring 32 may be adjusted by threaded adjustment of the nut 30 upon the bolt 28, and it is possible to vary the force necessary to release the blade 26 from its nested position by varying the compression of the spring.

Thus the present invention provides a new and novel type of safety clutch for a rotary cutter wherein the cutting element is driven through a driving element having a concave or dished surface against which the cutting element is bottomed. Means are provided for adjusting the forces retaining the blade in contact with the driving element, so that the force necessary to release the blade may be varied. Further, it will be appreciated that once released, the blade will become re-engaged with the driving means automatically upon the blade meeting only that resistance necessary to re-align the blade with the driving element 23 and the socket provided thereby.

It will, of course, be understood that various details of construction may be varied through a wide range without departing from the principles of this invention and it is, therefore, not the purpose to limit the patent granted hereon otherwise than necessitated by the scope of the appended claims.

We claim:

1. In a stalk cutter having a vertically disposed driven shaft, a cage secured to the shaft for rotation therewith and including an elongated driving plate having longitudinally extending inturned edges defining a concave surface, single bolt means carried by said cage and projecting through said plate, a swinging cutting blade rotatable about said bolt means and having a medial surface thereof abutting said concave surface of said plate intermediate said edges, and a spring surrounding said bolt means and urging said blade against said plate surface, said medial surface cooperating with said concave surface to produce axial displacement of said blade relative to said driving plate when said cutting blade strikes an obstruction, thereby interrupting transmission of rotary power to said cutting blade.

2. In a rotary cutter, a driven shaft, a clutch plate secured to said shaft and having a downwardly opening, laterally extending recess in one face thereof, the vertically extending walls of said recess being inclined with respect to the vertical to provide camming surfaces, a swinging blade normally seated in said recess in face-to-face engagement with said plate, a stub shaft projecting through said plate and said blade and aligned with said driven shaft, and resiliently deformable means retaining said blade in said recess for corotation with said plate, said camming surfaces cooperating with said blade upon subjection of said blade to a restraining force to produce axial movement of said blade from said recess against the bias of said resiliently deformable means, whereby said plate and said blade are freed for relative rotation about said stub shaft.

3. In a rotary cutter, a power driven rotatable member having a channel shaped element concentrically secured thereto, a cutting blade having central portions nestable in said channel shaped element and rotatably driven thereby, pivot means for coaxially pivotally securing said cutting blade to said channel shaped element, said pivot means permitting axial displacement of said cutting blade relative to said channel shaped element, resilient means opposing axial displacement of said cutting blade relative to said channel shaped element, said channel shaped element having opposed interior side walls inclined relative to the axis of rotation of said rotatable member, said inclined interior surfaces of said channel shaped element cooperating with said cutter blade to produce axial displacement of said cutter blade against the bias of said resilient means when said cutter blade strikes an obstruction.

References Cited in the file of this patent

UNITED STATES PATENTS

| Number | Name | Date |
|---|---|---|
| 2,471,367 | Cavaness | May 24, 1949 |